(12) United States Patent
Cudworth et al.

(10) Patent No.: US 11,115,463 B2
(45) Date of Patent: Sep. 7, 2021

(54) REMOTE AND LOCAL PREDICTIONS

(71) Applicant: Microsoft Technology Licensing, LLC, Redmond, WA (US)

(72) Inventors: Adam John Cudworth, London (GB); Alexander Gautam Primavesi, London (GB); Piotr Jerzy Holc, London (GB); Joseph Charles Woodward, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 15/358,633

(22) Filed: Nov. 22, 2016

(65) Prior Publication Data
US 2018/0053101 A1 Feb. 22, 2018

Related U.S. Application Data

(60) Provisional application No. 62/376,178, filed on Aug. 17, 2016.

(51) Int. Cl.
*H04L 29/08* (2006.01)
*G06N 20/00* (2019.01)
(Continued)

(52) U.S. Cl.
CPC .......... *H04L 67/10* (2013.01); *G06F 3/0488* (2013.01); *G06F 40/274* (2020.01); *G06N 20/00* (2019.01);
(Continued)

(58) Field of Classification Search
CPC ..... G06N 3/08; G06N 5/022; H04M 1/72522; H04L 51/02
See application file for complete search history.

(56) References Cited

U.S. PATENT DOCUMENTS 7,877,258 B1 * 1/2011 Chelba ................ G06F 17/2715
704/240
7,933,777 B2 * 4/2011 Koll ........................ G10L 15/32
704/270.1
(Continued)

OTHER PUBLICATIONS

Russakovskii, Artem, "Security Advisory: A.I. Type Keyboard Sends All Your Keystrokes to Their Servers in Plain-Text—Sometimes You Can't Trust the Cloud", Published on: Oct. 26, 2011 Available at: http://www.androidpolice.com/2011/10/26/security-advisory-a-i-type-keyboard-sends-all-your-keystrokes-to-their-servers-in-plain-text-sometimes-you-cant-trust-the-cloud/.
(Continued)

*Primary Examiner* — Alexey Shmatov
*Assistant Examiner* — Beatriz Ramirez Bravo
(74) *Attorney, Agent, or Firm* — Schwegman Lundberg & Woessner, P.A.

(57) ABSTRACT

The description relates to predicting terms based on text inputted by a user. One example includes a computing device comprising a processor configured to send, over a communications network, the text to a remote prediction engine. The processor is configured to send the text to a local prediction engine stored at the computing device, and to monitor for a local predicted term from the local prediction engine and a remote predicted term from the remote prediction engine, in response to the sent text. The computing device includes a user interface configured to present a final predicted term to the user such that the user is able to select the final term. The processor is configured to form the final predicted term using either the remote predicted term or the local predicted term on the basis of a time interval running from the time at which the user input the text.

15 Claims, 8 Drawing Sheets

(51) Int. Cl.
*G06F 3/0488* (2013.01)
*H04L 12/58* (2006.01)
*G06F 40/274* (2020.01)
*H04M 1/72403* (2021.01)
*H04M 1/72436* (2021.01)

(52) U.S. Cl.
CPC ........ *H04L 51/02* (2013.01); *H04M 1/72403* (2021.01); *H04M 1/72436* (2021.01)

(56) References Cited

U.S. PATENT DOCUMENTS

| | | | | |
|---|---|---|---|---|
| 8,364,709 | B1* | 1/2013 | Das | G06F 16/90335 |
| | | | | 707/780 |
| 8,738,356 | B2 | 5/2014 | Suzuki et al. | |
| 9,075,794 | B2 | 7/2015 | Leydon | |
| 9,704,476 | B1* | 7/2017 | Swietlinski | G10L 13/04 |
| 2003/0236827 | A1* | 12/2003 | Patel | H04L 41/0896 |
| | | | | 709/203 |
| 2013/0253908 | A1* | 9/2013 | Zhai | G06F 17/276 |
| | | | | 704/9 |
| 2014/0278349 | A1* | 9/2014 | Grieves | G06F 40/242 |
| | | | | 704/8 |
| 2014/0297267 | A1* | 10/2014 | Spencer | G06F 40/274 |
| | | | | 704/9 |
| 2014/0337007 | A1* | 11/2014 | Waibel | G10L 13/02 |
| | | | | 704/3 |
| 2015/0100537 | A1* | 4/2015 | Grieves | G06N 5/048 |
| | | | | 706/52 |
| 2015/0317069 | A1* | 11/2015 | Clements | G06F 40/274 |
| | | | | 715/773 |
| 2016/0180560 | A1 | 6/2016 | Patel et al. | |
| 2016/0359771 | A1* | 12/2016 | Sridhar | H04M 1/72552 |
| 2017/0270092 | A1* | 9/2017 | He | G06F 40/30 |
| 2017/0310616 | A1* | 10/2017 | Cao | G06F 3/04886 |

OTHER PUBLICATIONS

"What is Emoji Prediction", Published on: Nov. 19, 2014 Available at: https://blog.swiftkey.com/what-is-emoji-prediction/.

Spencer, Graham, "Emoji Type: A Predictive Emoji Keyboard", Published on: Dec. 17, 2014 Available at: https://www.macstories.net/reviews/emoji-type-a-predictive-emoji-keyboard/.

Defabio, et al., "The problem with Apple's new emoji software, and how AI could solve it", Published on: Jun. 17, 2016 Available at: http://fusion.net/story/315369/apples-new-emoji-software/.

Steeber, Michael, "Emoji Type keyboard brings predictive emoji typing to iOS", Published on: Dec. 17, 2014 Available at: https://9to5mac.com/2014/12/17/emoji-type-keyboard-brings-predictive-emoji-typing-to-ios/.

Sridhar, Srivatsan, "Wink it emoticon and image prediction keyboard for Android launched", Published on: Feb. 4, 2014 Available at: http://www.fonearena.com/blog/95102/wink-it-emoticon-and-image-prediction-keyboard-for-android-launched.html.

* cited by examiner

REMOTE AND LOCAL PREDICTIONS

CROSS-REFERENCE TO RELATED APPLICATION

This non-provisional utility application claims priority to US application Ser. No. 62/376,178 entitled "Remote And Local Predictions" and filed on 17 Aug. 2016, which is incorporated herein in its entirety by reference.

BACKGROUND

Predictive emoji keyboards predict emoji based on what the user has typed. The words and phrases typed by the user are used as inputs for a prediction model and the prediction model is used to generate one or more predicted emoji to be presented to the user. For example, referring to FIG. 1, a user might provide input text 10 "Running late, be home in 30 mins" using a personal computing device 12, and the device 12 subsequently presents predicted emoji 14, 16 and 18 to the user based on the input text 10.

Typically the prediction model is large and the process of calculating predictions using the model is Random Access Memory (RAM)-intensive. This is not suitable for a personal computing device which has a limited hard drive and limited RAM. As a result, the prediction model is stored on a server and the computing device requests predictions over a communications network. In this approach, predictions are not available to the computing device until they have been received from the server. This introduces a delay due to the lag involved in network communication. If the delay is long enough it can be quite noticeable to the user.

The embodiments described below are not limited to implementations which solve any or all of the disadvantages of known techniques.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

The description relates to predicting terms based on text inputted by a user. One example can include a computing device comprising a memory storing text that the user has inputted to the computing device. The computing device also includes a processor configured to send, over a communications network, the text to a remote prediction engine having been trained to predict terms from text. The processor is also configured to send the text to a local prediction engine stored at the computing device. The processor is configured to monitor for a local predicted term from the local prediction engine and to monitor for a remote predicted term from the remote prediction engine, in response to the sent text. The computing device also includes a user interface configured to present a final predicted term to a user of the computing device such that the user is able to select the final term to enter the final predicted term into the computing device. The processor is configured to form the final predicted term using either the remote predicted term or the local predicted term on the basis of a time interval running from the time at which the user input the text.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 6 is a schematic diagram showing generation of n-grams from text input;

Like reference numerals are used to designate like parts in the accompanying drawings.

DETAILED DESCRIPTION

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

The present disclosure presents a technique for forming a final predicted term based on text input from a user. The final predicted term is formed using a term predicted remotely or a term predicted locally.

Figure 2:
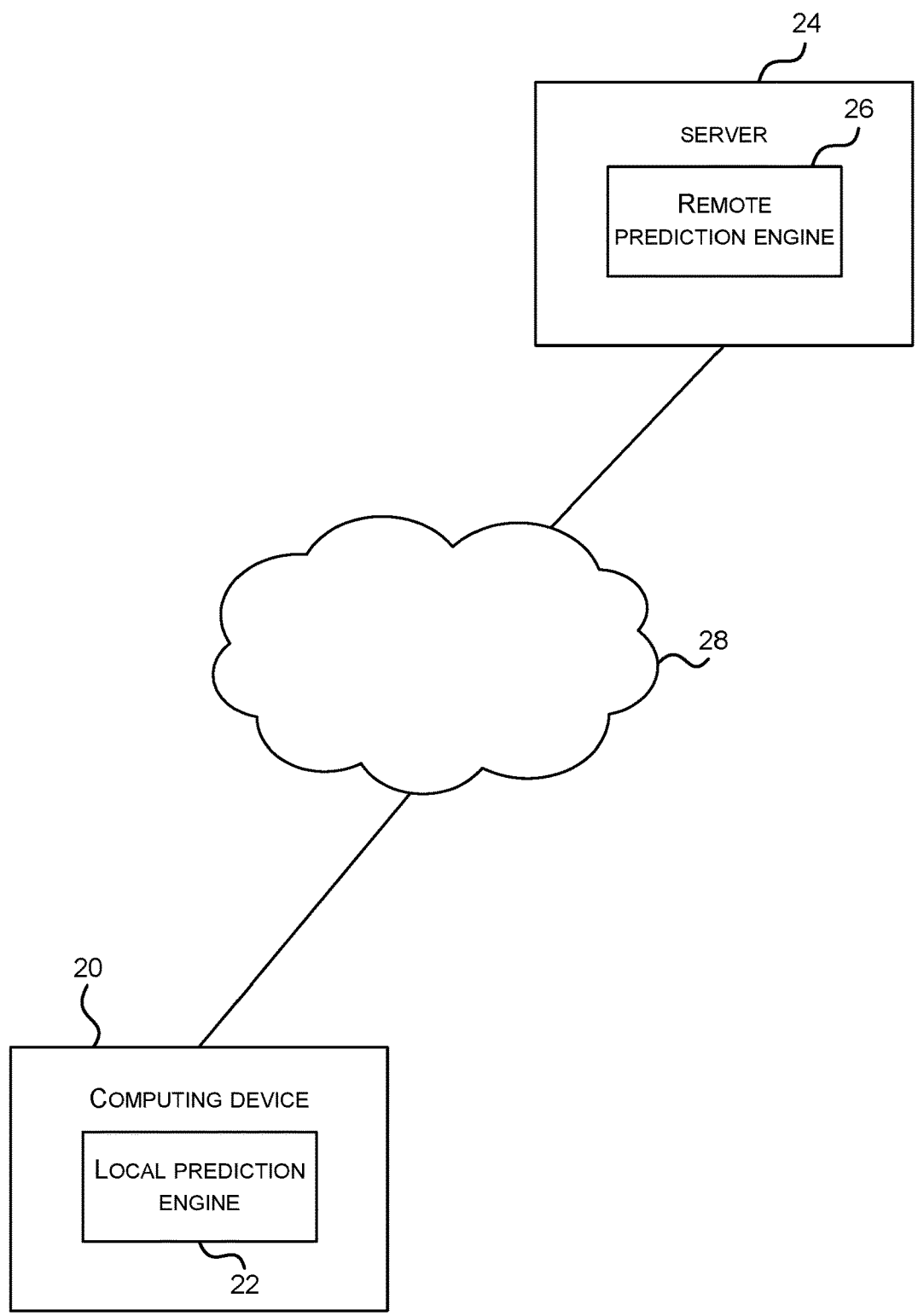
FIG. 2 is a schematic diagram of a system for predicting a term such as emoji from text input.

Referring to FIG. 2, a system for implementing the technique comprises a computing device 20 having a local prediction engine 22 and a server 24 having a remote prediction engine 26. The computing device 20 communicates with the server 24 using a communications network 28 such as the Internet.

The remote prediction engine 26 of the server 24 uses a remote prediction model. This is suitably a large file that supports a large vocabulary of input text, and the remote prediction engine 26 is RAM-intensive to run.

By contrast, the local prediction engine 22 of the computing device 20 uses a local prediction model which is related to the remote prediction model but is generally smaller, for example a subset of the remote prediction model. This may exclude rarely used words and therefore may not be able to predict emoji for rare input text, but the model is faster to download during app installation and the execution of the local prediction engine using the smaller local prediction model is less RAM-intensive. The local prediction model may have a special format arranged to reduce the RAM required to use it.

The predictions from the server 24 are considered to be better predictions, but they generally take longer that those generated locally at the computing device 20 because of the lag involved in network communication.

The present disclosure includes a technique for combining the two sources of predictions: the local predictions generated at the computing device 20 and the remote predictions generated at the server 24.

Figure 3:
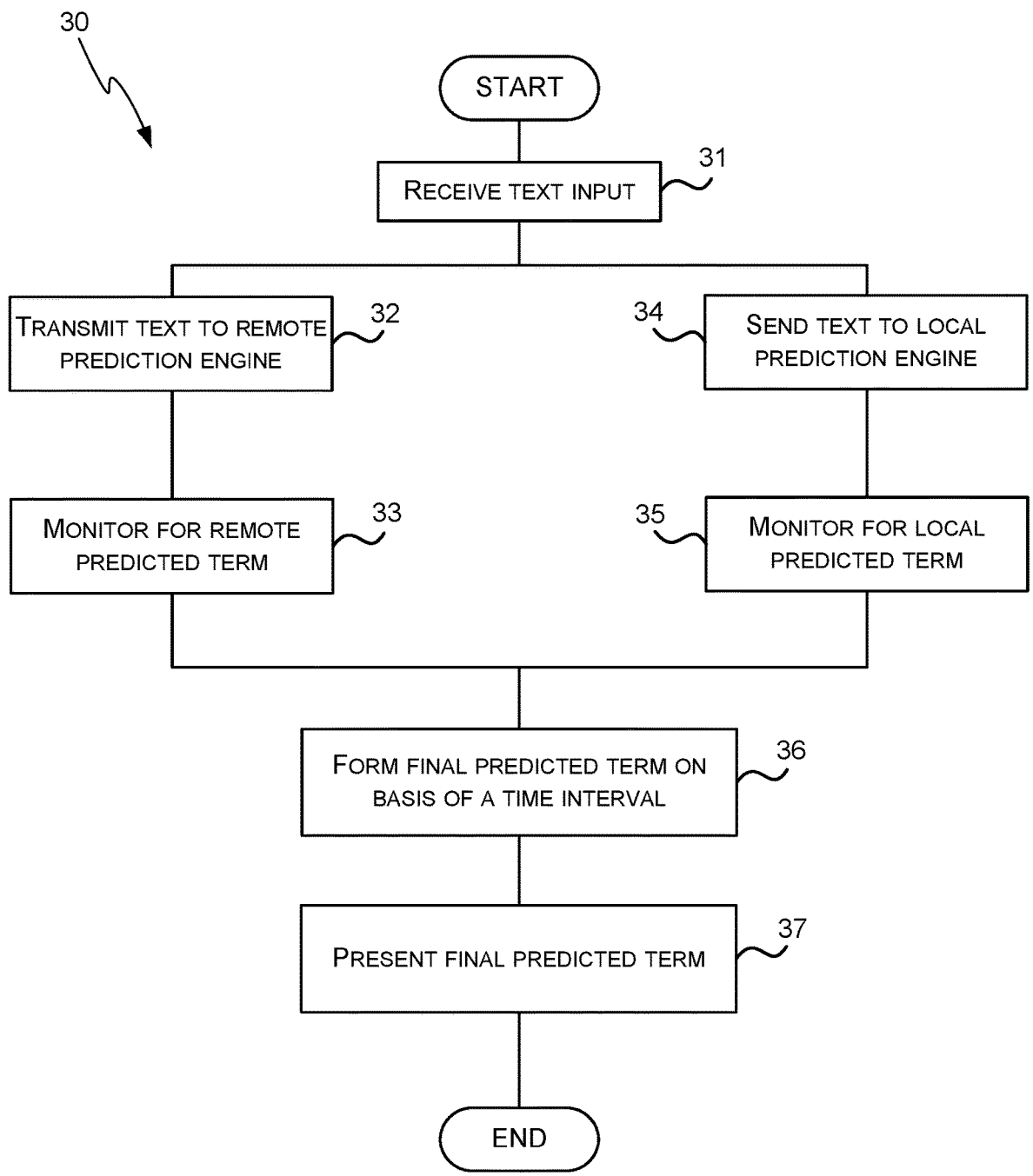
FIG. 3 is a flow chart showing a method of predicting a term such as an emoji from text input on the basis of a time interval according to the present disclosure.

Referring to FIG. 3, a method 30 of combining the two sources of predictions will now be described. Text input is received 31 by the computing device 20 from the user. The computing device 20 then runs two processes, for example in parallel. In the first process, the computing device 20 transmits 32 the inputted text to the server 24 over the communication network 28. The computing device 20 then monitors 33 for a remote prediction term provided to the computing device 20 by the server 24 over the communication network 28. In the second process, the computing device 20 sends 34 the inputted text to the local prediction engine 22. The computing device 20 then monitors 35 for a local predicted term generated by the local prediction engine 22.

Figure 1:
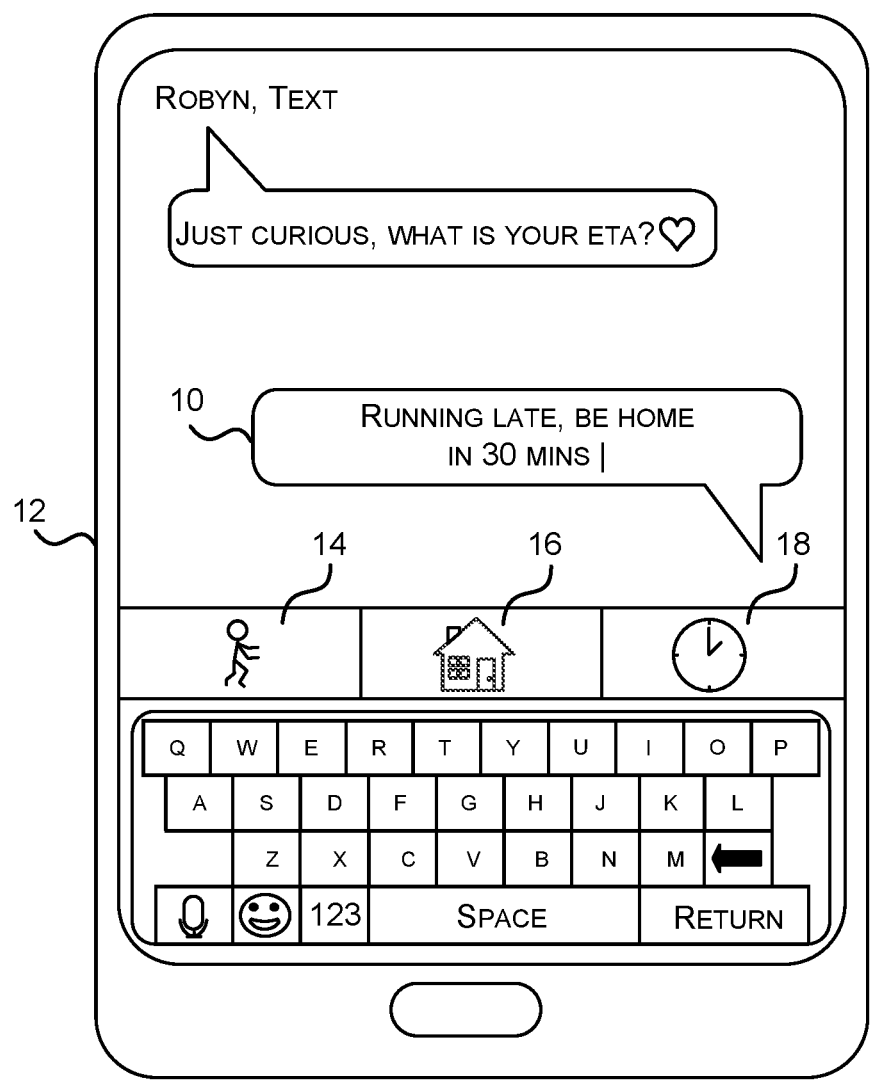
FIG. 1 is a schematic diagram of a mobile device presenting predicted emoji to a user based on text input.

Having performed the first and second processes, the computing device 20 forms 36 a final prediction term on the basis of a time interval running from the time at which the user inputted the input text. An example of this will be described below. After forming the final predicted term, the computing device 20 presents 37 the final predicted term to the user, for example in a similar way as shown for the predicted terms 14, 16 and 18 in FIG. 1.

Figure 4:
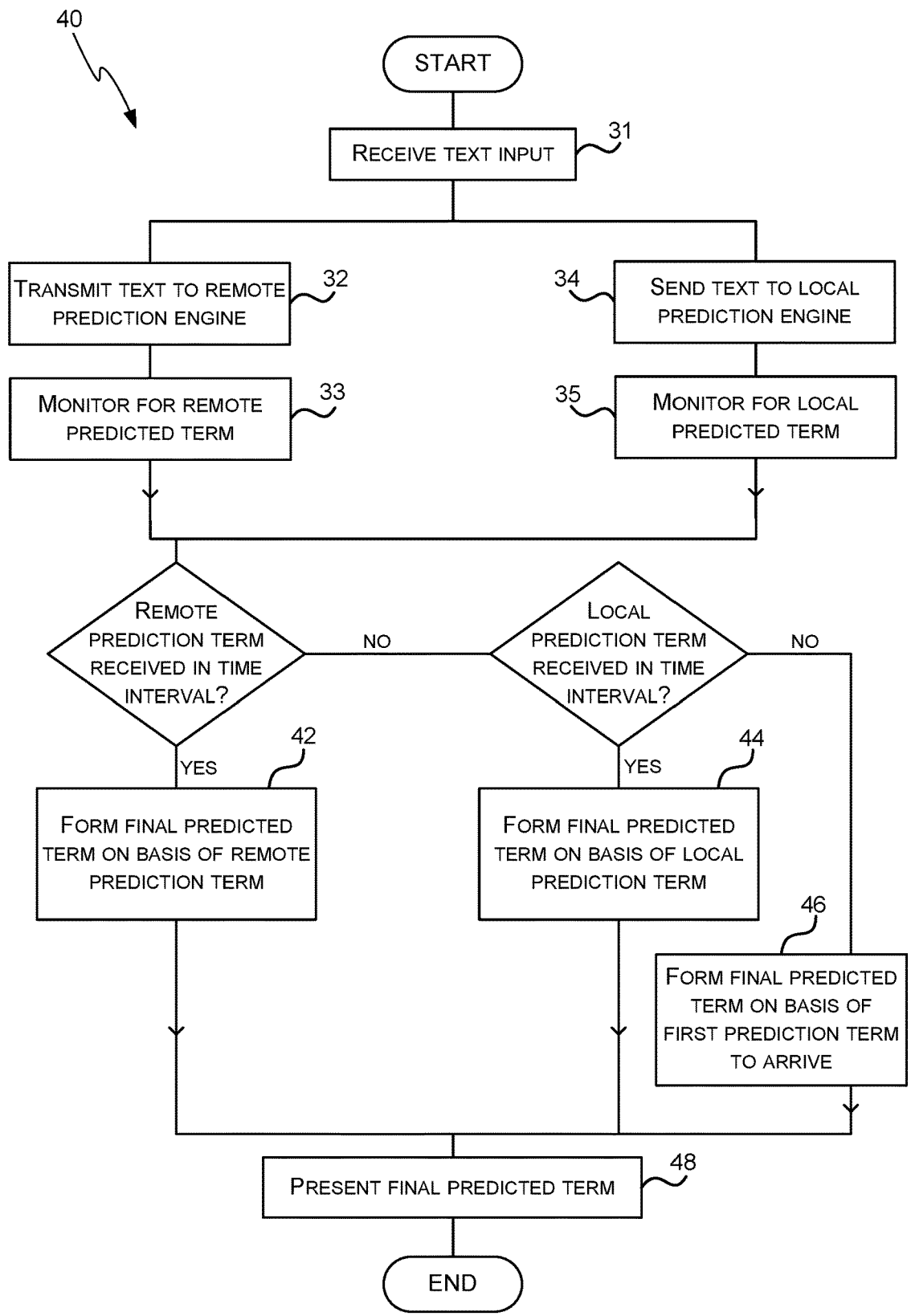
FIG. 4 is a flow chart showing an example of the method of FIG. 3.

Referring to FIG. 4, further a method 40 of combining the two sources of predictions will now be described. The method 40 may be considered as an example of the method 30 because it provides further details of the step of forming 36 a final predicted term on the basis of a time interval.

In method 40, the steps 31 to 35 are the same as method 30, so the description of these steps will not be repeated. In the method 40, after or during the monitoring steps 33 and 35, the computing device 20 forms 42 a final predicted term on the basis of a remote predicted term received from the server 24 over the communications network 28 if the remote predicted term is received by the computing device 20 in a time interval running from the time the user inputted the input text.

If a remote predicted term is not received by the computing device 20 in the time interval, but a local predicted term is received from the local prediction engine 22 of the computing device 20 in the time interval, the computing device 20 forms 44 a final predicted term on the basis of the local predicted term.

If a remote predicted term is not received in the time interval and a local predicted term is not received in the time interval, the computing device 20 forms 46 a final predicted term on the basis of a first prediction term to arrive—i.e. whichever of a remote predicted term or a local predicted term arrives first. It is noted that if the remote prediction fails, then, assuming the local prediction does not fail, the local prediction term will arrive first (and the remote prediction term will not arrive at all). In this case the computing device 20 forms 46 a final predicted term on the basis of the local prediction term. This scenario provides a back-up in case the computing device 20 loses connection to the communications network 28.

Finally, the computing device 20 presents 48 the final predicted term to the user.

This approach makes use of both remote and local sources of prediction terms and strikes a balance between displaying predictions to the user within a reasonable time period and avoiding changing the displayed predictions (e.g. from local to remote) once they have been presented to the user. A suitable time interval is 0.45 seconds. This is short enough for the user not to be aware that they are waiting for something. It also results in approximately 75% of the presented predictions being remote predictions and approximately 25% being local predictions. Other suitable time intervals can be used, for example time intervals within the range 80 milliseconds to 1000 milliseconds.

The time interval could be dynamic by being varied based on various parameters such as the speed or type of a connection of the computing device to a communications network, the location of the computing device, or user preferences. In some examples, an input means is provided enabling the user to "upgrade" to remote predictions if the computing device initially presents local predicted terms when implementing method 40.

Figure 5:
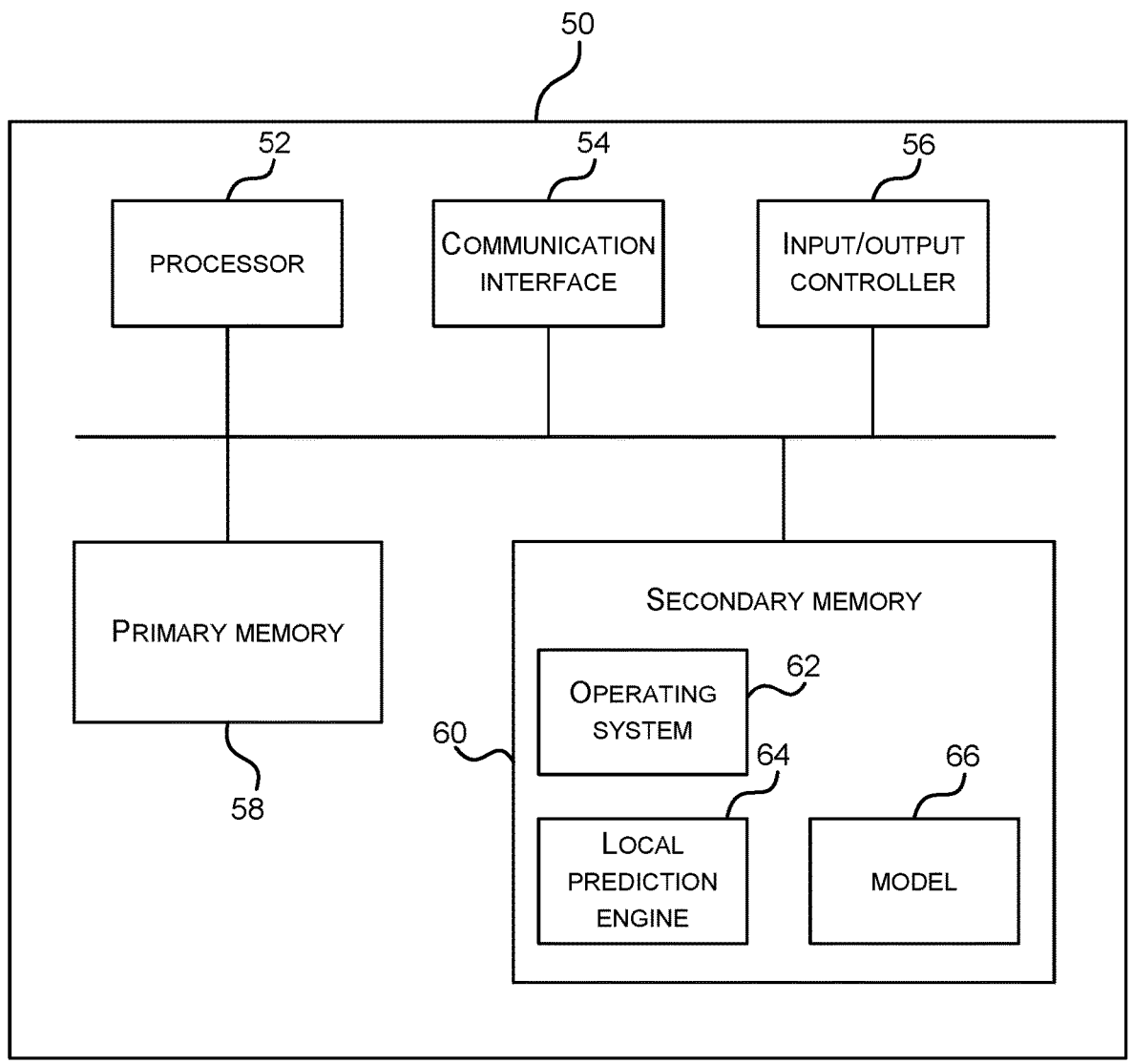
FIG. 5 is a schematic diagram of a computing device suitable for performing the method of FIG. 3 or FIG. 4.

A computing device 50 suitable for implementing the methods 30 and 40 is shown in FIG. 5. The computing device 50 comprises a processor 52, a communication interface 54, an input/output controller 56, a primary memory 58 such as RAM, and a secondary memory 60 such as a hard-disk. The secondary memory 60 stores an operating system 62, a local prediction engine 64 and a local prediction model 66.

A further method 70 according to the disclosure will now be described in relation to FIG. 6 and FIG. 7. The method 70 may be performed by a computing device such as computing device 20.

Referring to FIG. 6, input text 67 "I am go" may be used to generate n-grams 68. An n-gram is a sequence of n written language components (usually words, sometimes including characters such as punctuation characters or emoji), where n can be any whole, positive number. For example, an n-gram may be a word, phrase, or part of a phrase occurring in the text input. In the example of FIG. 6, six n-grams can be generated from the input text 67 "I am go".

Figure 7:
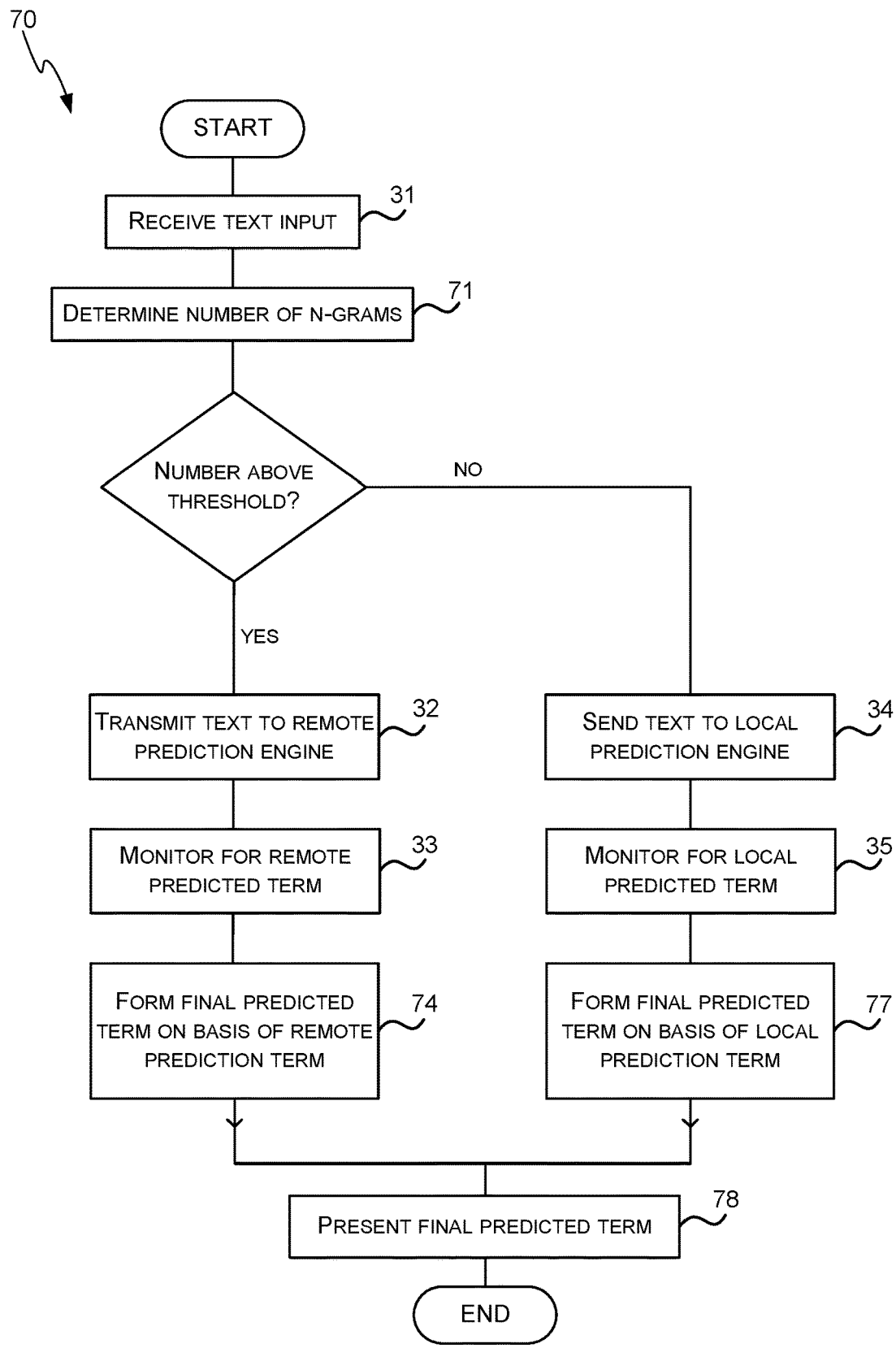
FIG. 7 is a flow chart showing a method of predicting a term such as an emoji from text input on the basis of a number of n-grams in the text input according to the present disclosure.

Referring to FIG. 7, the method 70 comprises receiving 31 text input from the user and determining 71 the number of n-grams in the text input. If the number of n-grams is above a threshold, the computing device 20 implements the first process as described above (i.e. steps 32 and 33) and forms 74 a final predicted term on the basis of a remote predicted term. If the number of n-grams is not above the threshold, the computing device 20 implements the second process as described above (i.e. steps 34 and 35) and forms 77 a final predicted term on the basis of a local predicted term.

Finally, the computing device 20 presents 78 the final predicted term to the user.

A further method 80 according to the disclosure will now be described in relation to FIG. 8. The method 80 may be performed by a computing device such as computing device 20.

Figure 8:
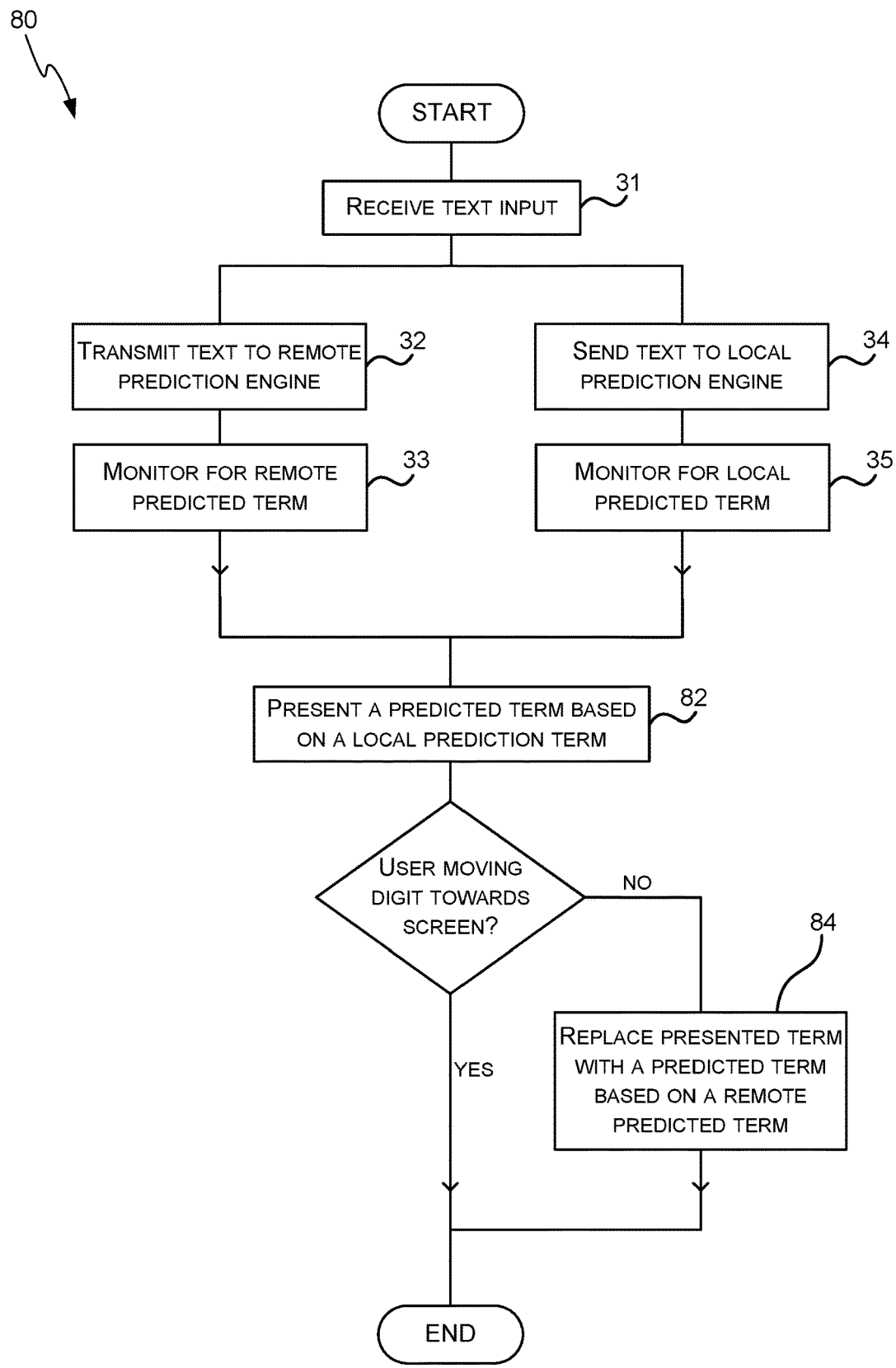
FIG. 8 is a flow chart showing a method of predicting a term such as an emoji from text input on the basis of a further user input according to the present disclosure.

Referring to FIG. 8, the method 80 comprises the steps 31 to 35 as described above, so the description of these steps will not be repeated here. The method 80 then comprises presenting 82 a predicted term based on a local predicted term, for example immediately after the local predicted term is received from a local prediction engine. After presenting the local predicted term, the computing device 20 replaces 84 the local predicted term with a remote predicted term unless it is determined that the user is moving a digit such as a finger towards the screen as if to select a presented local predicted term.

The technique disclosed herein could be used for any predictive keyboard, whether for words, emoji or both, or any other kind of data. In the case of predicting words, the format of the model would include delimiters to distinguish between input text and predicted text.

In the above description, the techniques are implemented using instructions provided in the form of stored software. Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

The term 'computer' or 'computing-based device' is used herein to refer to any device with processing capability such that it executes instructions. Those skilled in the art will realize that such processing capabilities are incorporated into many different devices and therefore the terms 'computer' and 'computing-based device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

The term 'subset' is used herein to refer to a proper subset such that a subset of a set does not comprise all the elements of the set (i.e. at least one of the elements of the set is missing from the subset).

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The methods herein, which involve input text from users in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner.

The invention claimed is:

1. A computing device comprising a processor and memory, the memory storing thereon computer-readable instructions that, when executed by the processor, configure the computing device to perform operations comprising:
   receive text input;
   send, over a communications network, data indicative of the text input to a remote prediction engine having been trained to predict items based on text;
   determine a number of n-grams in the text input;
   determine whether the number of n-grams exceeds a remote prediction threshold, the remote prediction threshold indicating a maximum number of n-grams for local processing by the computing device using a local prediction engine;
   wherein the computing device is configured to, in response to a determination that the number of n-grams exceeds the remote prediction threshold, provide the received text input to the remote prediction engine and provide the received text input to the local prediction engine executing at the computing device;

monitor, based on the determination that the number of n-grams exceeds the remote prediction threshold, for a remote predicted item from the remote prediction engine;

wherein the computing device is configured to, in response to receiving the remote predicted item within a time interval determined from the time at which the text input is received, generate a final predicted item based on the remote predicted item and in response to not receiving the remote predicted item within the time interval, generate the final predicted item based on a local predicted item from the local prediction engine; and present, on a user interface of the computing device, the final predicted item, the user interface operable to receive an acknowledgment to enter the final predicted item into the computing device.

2. The computing device of claim 1, wherein the remote prediction engine is more accurate than the local prediction engine.

3. The computing device of claim 1, wherein the local prediction engine is related to the remote prediction engine.

4. The computing device of claim 1, wherein the local prediction engine comprises a local prediction model and the remote prediction engine comprises a remote prediction model, and the local prediction model is a subset of the remote prediction model and the local prediction model is configured to use less memory than the remote prediction model.

5. The computing device of claim 4, wherein n-grams with usage counts under a threshold are included in the remote model but not in the local model.

6. The computing device of claim 1, further comprising computer-readable instructions that, when executed by the processor, configure the computing device to perform operations comprising merging results from the remote prediction engine and the local prediction engine.

7. The computing device of claim 1, wherein the time interval is in the range 80 ms to 1000 ms.

8. The computing device of claim 1, wherein the time interval is dynamically adjusted based on a local condition.

9. The computing device of claim 8, wherein the local condition comprises a parameter of a connection over the communications network.

10. The computing device of claim 1, further comprising computer-readable instructions that, when executed by the processor, configure the computing device to perform operations comprising presenting additional final predicted items formed from remote predicted items as they arrive if they are received after the time interval.

11. A method performed by a computing device, the method comprising:

receiving, by the computing device, text input;

sending, over a communications network, data indicative of the text input to a remote prediction engine having been trained to predict items based on text data;

determining a number of n-grams in the text input;

determining whether the number of n-grams exceeds a remote prediction threshold, the remote prediction threshold indicating a maximum number of n-grams for local processing by the computing device using a local prediction engine;

in response to determining that the number of n-grams exceeds the remote prediction threshold, providing the received text input to the remote prediction engine and providing, by the computing device, data indicative of the text to the local prediction engine executing at the computing device;

monitoring, by the computing device, based on determining that the number of n-grams exceeds the remote prediction threshold, for a remote predicted item from the remote prediction engine;

in response to receiving the remote predicted item within a time interval determined from the time at which the text input is received, generating a final predicted item based on the remote predicted item or in response to not receiving the remote predicted item within the time interval, generating the final predicted item based on a local predicted item from the local prediction engine; and presenting the final predicted item on the computing device.

12. The method of claim 11, wherein the remote prediction engine is more accurate than the local prediction engine.

13. The method of claim 11, wherein the local prediction engine is related to the remote prediction engine.

14. The method of claim 11, wherein the local prediction engine comprises a local prediction model and the remote prediction engine comprises a remote prediction model, and the local prediction model is a subset of the remote prediction model and the local prediction model is configured to use less memory than the remote prediction model.

15. At least one non-transitory computer readable medium including instructions that when executed by at least one processor of a computing device, cause the at least one processor to:

receive text input;

send, over a communications network, data indicative of the text input to a remote prediction engine having been trained to predict items based on text;

determine a number of n-grams in the text input;

determine whether the number of n-grams exceeds a remote prediction threshold, the remote prediction threshold indicating a maximum number of n-grams for local processing by the computing device using a local prediction engine;

in response to determining that the number of n-grams exceeds the remote prediction threshold, provide the received text input to the remote prediction engine and provide the received text input to the local prediction engine executing at the computing device;

monitor, based on the determination that the number of n-grams exceeds the remote prediction threshold, for a remote predicted item from the remote prediction engine;

wherein the computing device is configured to, in response to receiving the remote predicted item within a time interval determined from the time at which the text input is received, generate a final predicted item based on the remote predicted item and in response to not receiving the remote predicted item within the time interval, generate the final predicted item based on a local predicted item from the local prediction engine; and present, on a user interface of the computing device, the final predicted item, the user interface operable to receive an acknowledgment to enter the final predicted item into the computing device.

\* \* \* \* \*